(12) United States Patent
Kim et al.

(10) Patent No.: US 9,878,645 B2
(45) Date of Patent: Jan. 30, 2018

(54) ELECTRIC-POWERED HEADREST

(71) Applicant: HYUNDAI DYMOS INCORPORATED, Seosan-si Chungcheongnam-do (KR)

(72) Inventors: Do Hyung Kim, Yongin-si (KR); Ho Sub Lim, Seoul (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 15/126,686

(22) PCT Filed: Mar. 17, 2015

(86) PCT No.: PCT/KR2015/002567
§ 371 (c)(1),
(2) Date: Sep. 16, 2016

(87) PCT Pub. No.: WO2015/142027
PCT Pub. Date: Sep. 24, 2015

(65) Prior Publication Data
US 2017/0088025 A1    Mar. 30, 2017

(30) Foreign Application Priority Data
Mar. 17, 2014    (KR) .................. 10-2014-0030768

(51) Int. Cl.
*A47C 7/36* (2006.01)
*A47C 7/38* (2006.01)
(Continued)

(52) U.S. Cl.
CPC ......... *B60N 2/4864* (2013.01); *B60N 2/0232* (2013.01); *B60N 2002/024* (2013.01); *B60N 2002/0236* (2013.01)

(58) Field of Classification Search
CPC ............... B60N 2/4864; B60N 2/0232; B60N 2002/024; B60N 2002/0236
(Continued)

(56) References Cited

U.S. PATENT DOCUMENTS 4,977,973 A * 12/1990 Takizawa ............... B60N 2/487
297/408 X
7,232,187 B1 * 6/2007 Sundararajan ....... B60N 2/0232
297/391
(Continued)

FOREIGN PATENT DOCUMENTS

KR    10-1998-137476 A    8/1998
KR    10-2004-0044782 A    5/2004
(Continued)

OTHER PUBLICATIONS

International Search Report, PCT/KR2015/002567, filed Mar. 17, 2015, search dated Jun. 26, 2015, 2pp.

*Primary Examiner* — Rodney B White
(74) *Attorney, Agent, or Firm* — Brinks Gilson & Lione

(57) ABSTRACT

Disclosed is an electric-powered headrest comprising: a plate-shaped base which is fixed to the upper portion of a stay rod and has a bent part formed therein, the bent part having opposite ends upwardly bent; a main bracket which has a coupling part formed on the lower end thereof to be coupled to the bent part of the plate-shaped base and pivots back and forth around the coupling part; an operating part arranged in a space part formed in the main bracket; and a lead screw which has one end coupled to the main bracket and the other end coupled to the operating part, and moves back and forth according to an operation of the operating part.

7 Claims, 7 Drawing Sheets

(51) Int. Cl.
*B60N 2/48* (2006.01)
*B60N 2/02* (2006.01)

(58) Field of Classification Search
USPC ......... 297/62, 391, 403, 404, 405, 406, 407, 297/408, 409, 410
See application file for complete search history.

(56) References Cited

U.S. PATENT DOCUMENTS

| | | | |
|---|---|---|---|
| 9,096,154 B2* | 8/2015 | Kwon | B60N 2/4852 |
| 2011/0031796 A1* | 2/2011 | Hong | B60N 2/4829 |
| | | | 297/410 |
| 2016/0129816 A1* | 5/2016 | Lee | B60N 2/4864 |
| | | | 297/409 |
| 2016/0250953 A1* | 9/2016 | Yoo | B60N 2/4852 |
| | | | 297/410 |

FOREIGN PATENT DOCUMENTS

| | | |
|---|---|---|
| KR | 10-1071615 B1 | 10/2011 |
| KR | 10-2012-0008578 A | 2/2012 |
| KR | 10-2012-0010549 A | 12/2012 |
| KR | 10-1298550 B1 | 8/2013 |

* cited by examiner

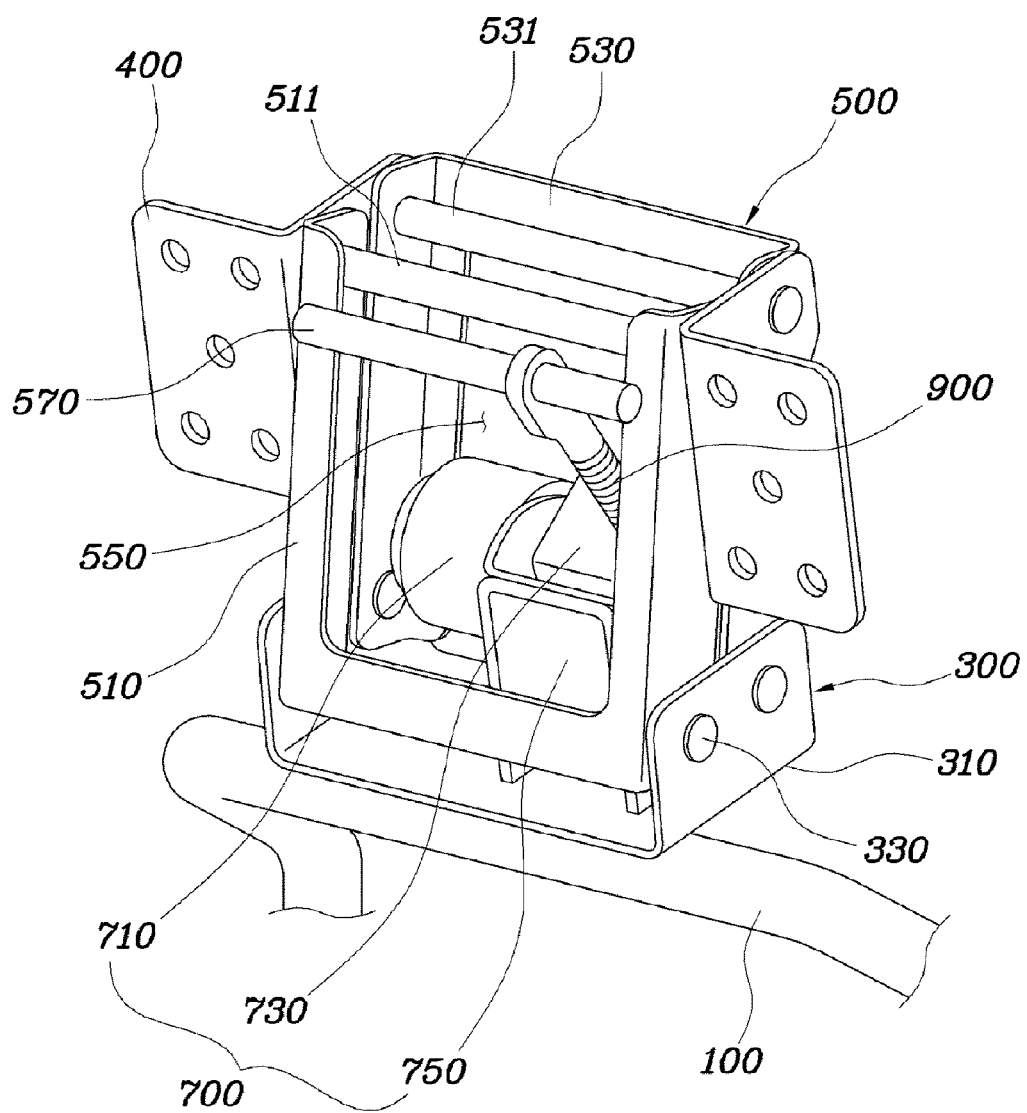
[FIG.1]

[FIG.2]
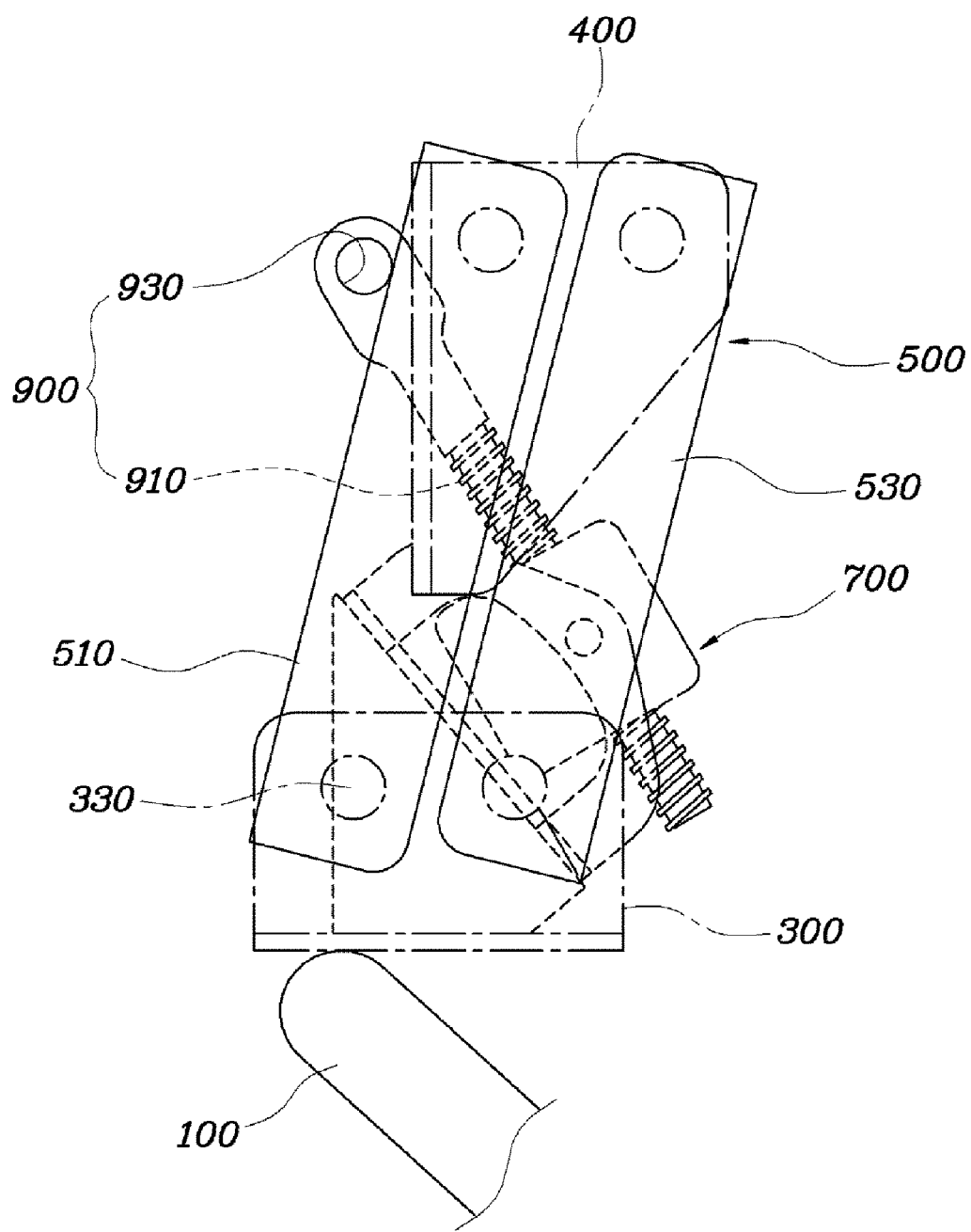

【FIG.3】
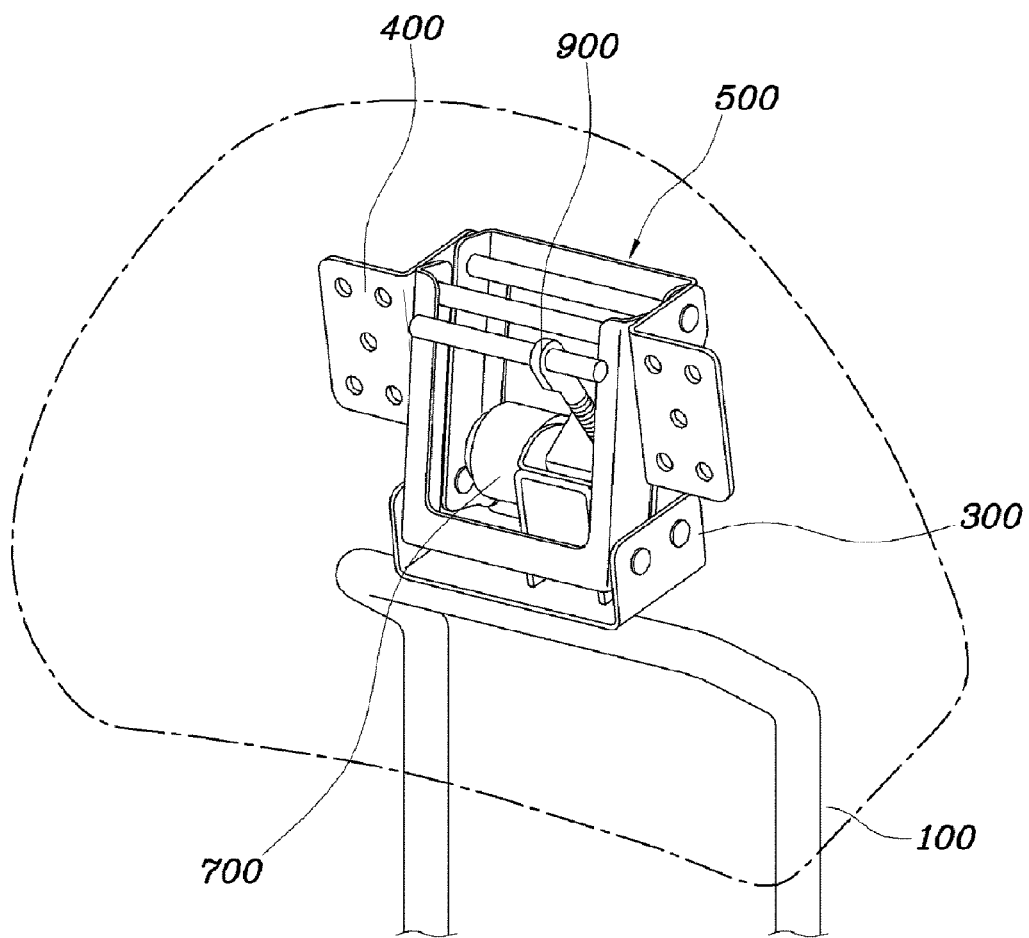

[FIG.4]
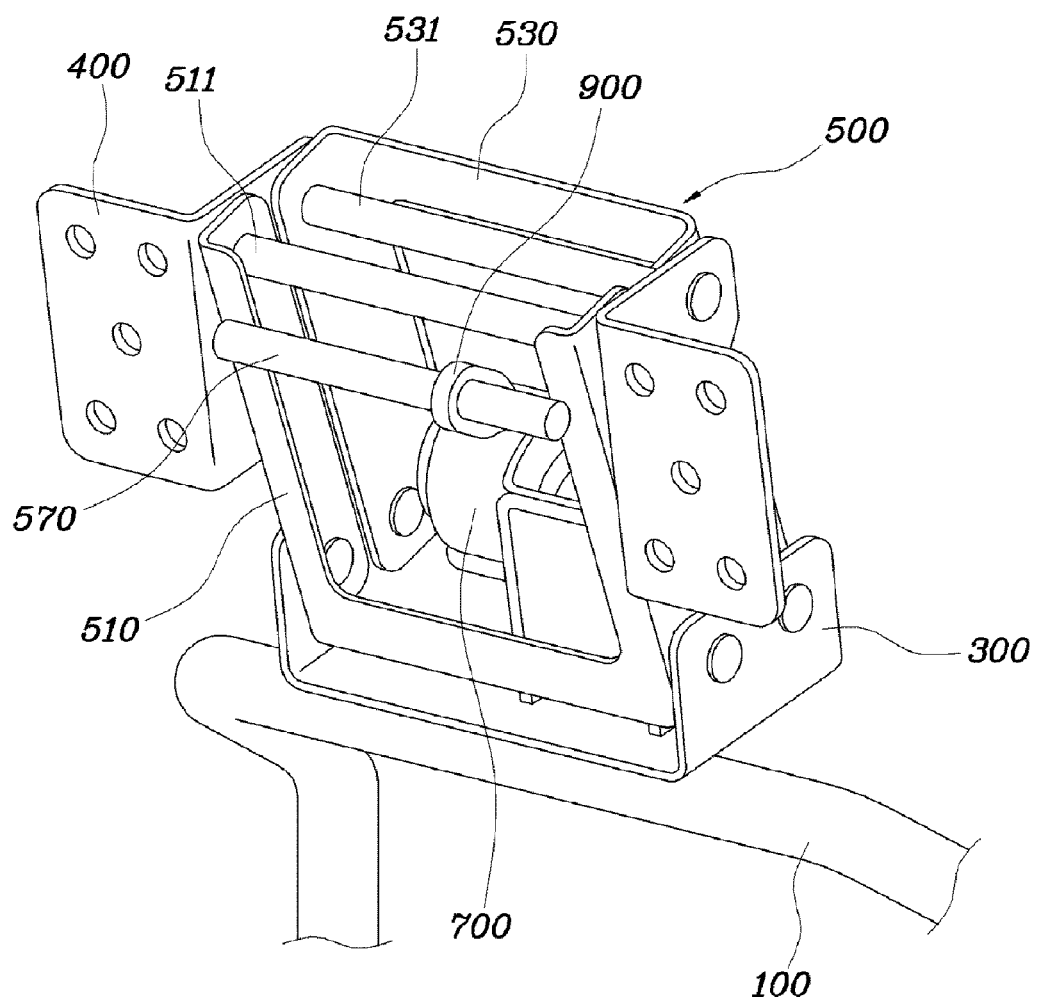

[FIG.5]
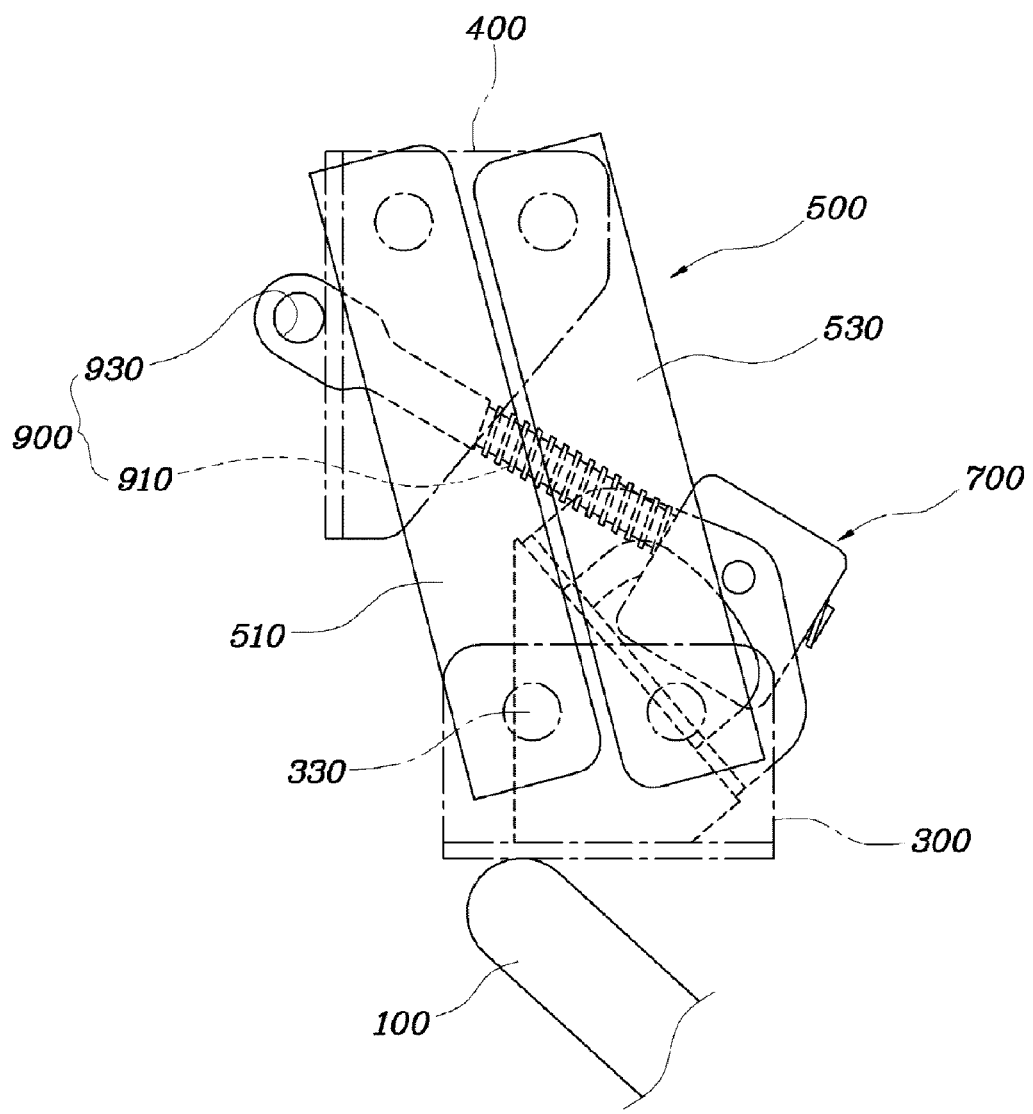

[FIG.6]
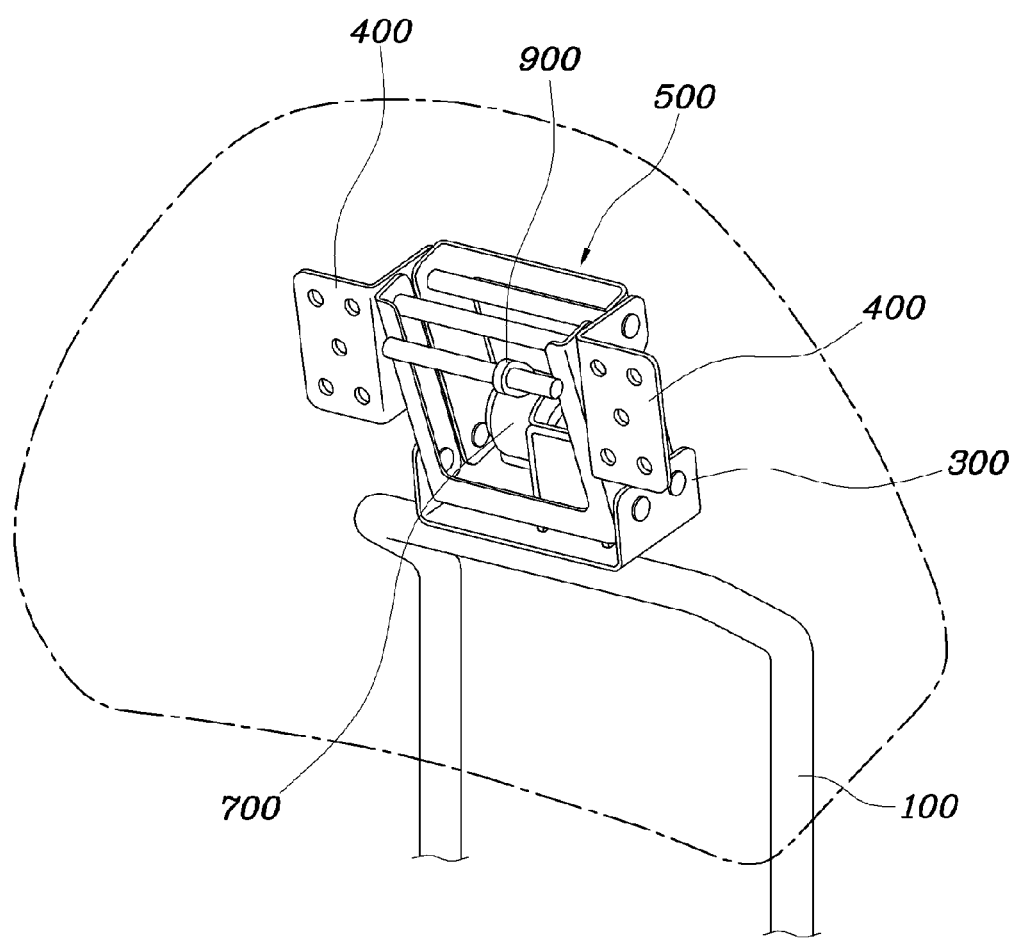

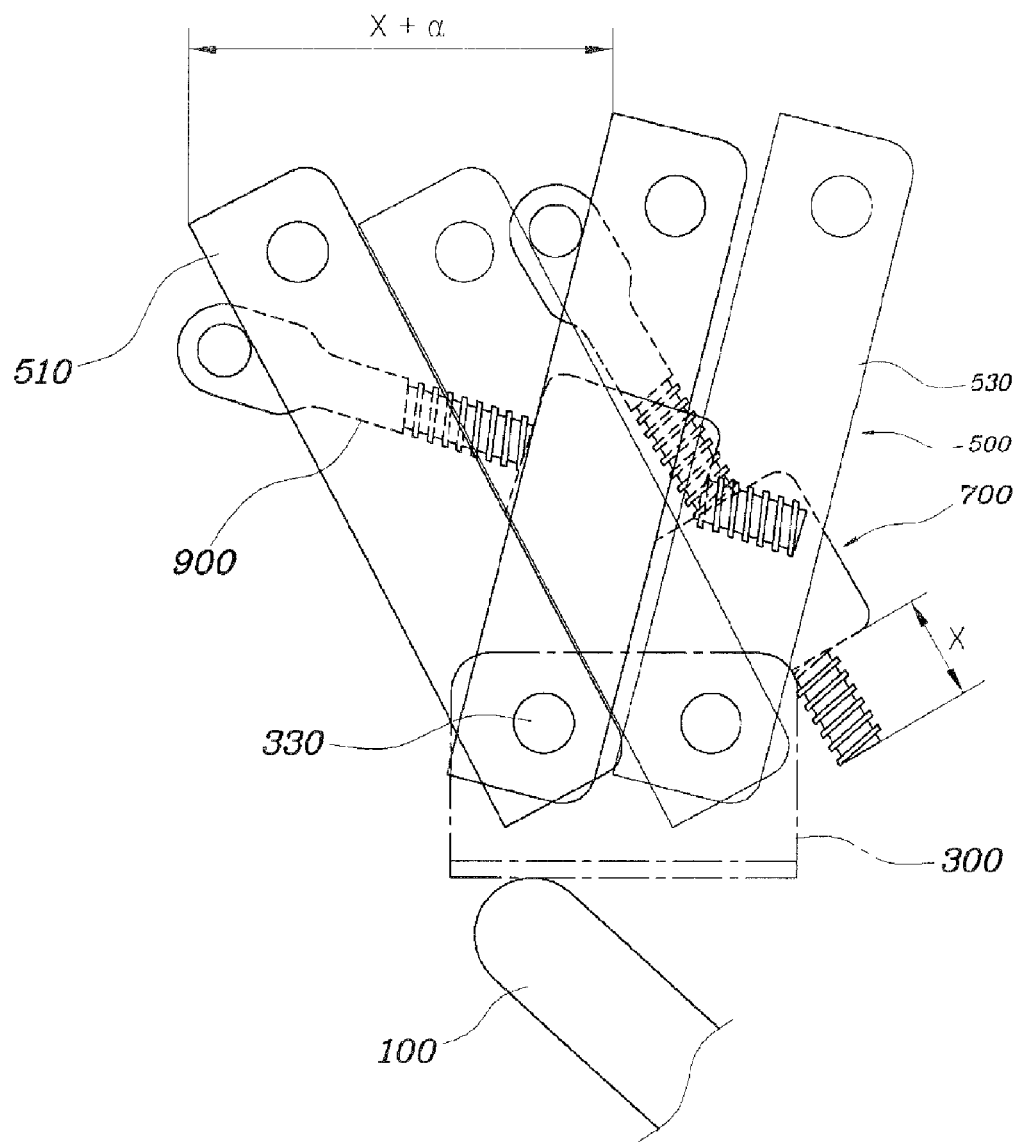
[FIG.7]

ELECTRIC-POWERED HEADREST

CROSS-REFERENCE TO RELATED APPLICATIONS

This application is a filing under 35 U.S.C. § 371 of International Patent Application PCT/KR2015/002567, filed Mar. 17, 2015, and claims the priority to KR 10-2014-0030768, filed Mar. 17, 2014. These applications are incorporated by reference herein in their entirety.

FIELD

The present disclosure is proposed to solve the problems occurring in the related art, and relates to an electric-powered headrest that is configured to be adjustable back and forth, thus increasing user convenience.

BACKGROUND

Generally, a headrest is mounted on an upper end of a vehicle seat to protect a user's neck or provide a comfortable surface to lean his or her head against, so that the height and angle of the headrest must be capable of being adjusted to match the physical attributes or preference of a user.

Further, the headrest plays an important role in mitigating shock to the neck due to inertia in the event of a vehicle collision. Therefore, first of all, it is important to adjust the headrest to fit a user's body. However, it is common to use the headrest without any setting because of the inconvenience of manipulation.

A conventional headrest is problematic in that it is inconvenient to use, and especially, a headrest of a back seat is simply divided into a use position and a non-use position depending on using conditions, and the headrest is always biased backwards by a spring, so that it is impossible to adjust the headrest back and forth when in use.

Furthermore, a headrest adjusted back and forth in a straight line is problematic in that a length of the lead screw corresponding to a required adjustment amount should be secured, so that a size of the headrest is inevitably increased, thus causing increase in both weight and cost. In addition, if the design of the headrest is fixed, this restricts the length of the lead screw, so that it is impossible to secure a required moving amount, thus hindering a user's convenience and vehicle roominess.

The foregoing is intended merely to aid in the understanding of the background of the present invention, and is not intended to mean that the present invention falls within the purview of the related art that is already known to those skilled in the art.

SUMMARY

Accordingly, the present disclosure provides an electric-powered headrest, which is adjustable back and forth using a link structure unlike the related art, thus securing a larger amount of operation per the same lead-screw length, in comparison with the conventional headrest adjusted back and forth in a straight line, thereby minimizing the size of the headrest, and increasing a user's convenience.

In an aspect, the present disclosure provides an electric-powered headrest including: a plate-shaped base fixed to an upper portion of a stay rod and having a bent part formed therein, the bent part having opposite ends upwardly bent; a main bracket having a coupling part formed on a lower end thereof to be coupled to the bent part of the plate-shaped base, wherein a space is formed in the main bracket, and the main bracket is configured to pivot back and forth around the coupling part; an operating part arranged in the space; and a lead screw coupled at a first end thereof to the main bracket and coupled at a second end thereof to the operating part, so that the lead screw moves back and forth by an operation of the operating part.

The lower end of the main bracket may be coupled to the plate-shaped base via a pin to pivot back and forth.

The electric-powered headrest may further include a bent plate-shaped side bracket provided on a side of the main bracket, and the bent plate-shaped side bracket is configured to support a headrest pad.

A hinge shaft may be formed on an upper portion of a front of the main bracket to laterally traverse the main_bracket, the first end of the lead screw being rotatably coupled to the hinge shaft.

The main bracket may include a front bracket provided on a front side thereof and a rear bracket provided on a rear side thereof.

At least one link may be provided on upper portions of the front and rear brackets, respectively, to traverse the brackets, the link may be coupled to the brackets respectively to allow the brackets to pivot back and forth around the link.

The operating part may include a driving part configured to generate power, and a gear part coupled to a rotating shaft of the driving part and having a gear formed thereon, so that the gear of the gear part engages with threads of the lead screw to allow the lead screw to move back and forth.

According to the electric-powered headrest configured as described above, a user operates a driving part and a gear part using a switch, thus allowing the headrest to be delicately adjusted depending on his or her preference and convenience, and consequently increasing his or her convenience and comfort. Further, the present disclosure reduces the risk of the headrest being arbitrarily moved forwards by an unintended external force at a headrest adjusting position and thereby coming into contact with a user's body, and reduces an increase in neck injury value due to the undesirable operation of a mechanism caused by external force, thus improving safety.

In addition, the driving part is operated using a separate switch, thus solving the problems of a manual headrest operating mechanism, for example, discomfort according to a passenger's body shape, and a difficulty in operation because it is difficult to recognize an operating direction, while improving operability and enhancing a user's recognizability and vehicle roominess, and consequently increasing his or her convenience.

Further, it is possible to realize a maximum operation amount using a minimum package, thus minimizing the size of a headrest, reducing weight and cost, and attaining an unique model, thereby improving profitability and marketability. Consequently, it is possible to achieve a rebranding effect.

DRAWINGS

FIG. 1 is a view illustrating an electric-powered headrest according to one form of the present disclosure;

FIG. 2 is a side view of FIG. 1;

FIG. 3 is a view illustrating a state in which the electric-powered headrest of FIG. 1 is mounted on a vehicle;

FIGS. 4 to 6 are views illustrating states after operation of FIGS. 1 to 3, respectively; and FIG. 7 is a view illustrating an operation amount according to a moving distance of a lead screw.

DETAILED DESCRIPTION

Hereinafter, an electric-powered headrest according to one form of the present disclosure will be described with reference to the accompanying drawings.

FIG. 1 is a view illustrating an electric-powered headrest according to one form of the present disclosure, FIG. 2 is a side view of FIG. 1, and FIG. 3 is a view illustrating a state in which the electric-powered headrest of FIG. 1 is mounted on a vehicle. Further, FIGS. 4 to 6 are views illustrating states after operation of FIGS. 1 to 3, respectively, and FIG. 7 is a view illustrating an operation amount according to a moving distance of a lead screw 900.

The electric-powered headrest according to the present disclosure includes a plate-shaped base 300 that is fixed to an upper portion of a stay rod 100 and has a bent part 310 formed therein, the bent part having opposite ends upwardly bent; a main bracket 500 that has a coupling part 330 formed on a lower end thereof to be coupled to the bent part 310 of the base 300, and has a space 550 therein, the main bracket being formed to pivot back and forth around the coupling part 330; an operating part 700 that is arranged in the space 550; and a lead screw 900 that is coupled at one end thereof to the main bracket 500 and coupled at the other end thereof to the operating part 700, so that the lead screw moves back and forth by an operation of the operating part 700.

The base 300 is fixed to the upper portion of the stay rod 100, has the plate shape, and is bent at left and right ends to extend upwards to a predetermined length, thus forming the bent part 310. The main bracket 500 is pinned or hinged to the bent part 310 of the base 300 to pivot around the coupling part 330. Here, the main bracket 500 pivots back and forth. According to this form, coupling parts 330 are formed at four places. The main bracket 500 performs four link motions via the four coupling parts 330. The position and number of the coupling parts 330 may be changed as desired depending on design or environment.

The lower end of the main bracket 500 is coupled to the bent part 310 of the base 300 to form the coupling part 330, with the space 550 defined in the main bracket 500. Further, side brackets 400 are fixed to left and right sides of the main bracket 500. The side brackets 400 are fixed to the sides of the main bracket 500 to come into close contact therewith, extend forwards from the sides and then are bent leftwards and rightwards to support a headrest pad, and are pinned or hinged to the upper portion of the main bracket 500 to perform link motion when the main bracket 500 is operated.

The operating part 700 is arranged in the space 550 of the main bracket 500. The operating part 700 includes a driving part 710 that generates power, a gear part 730 that causes the lead screw 900 to move back and forth, and a fixing part 750 that fixes the gear part 730.

The operating part 700 may usually be a motor that rotates around a rotating shaft. Further, the gear part 730 may be coupled to an end of the rotating shaft of the driving part 710, or may be a shaft that is formed by extending the rotating shaft. An end of the gear part may be formed to have a gear shape, and the gear of the gear part 730 engages with threads 910 formed on the other end of the lead screw 900. By the operation of the driving part 710, the gear part 730 is rotated, and the lead screw 900 engaging with the gear part 730 moves back and forth, so that the upper portion of the main bracket 500 coupled with the one end of the lead screw 900 and the coupling part 330 provided on the lower end of the main bracket 500 perform a link motion back and forth.

The gear part 730 of the operating part 700 and the lead screw 900 may be operated on the principle of rack and pinion gears. Alternatively, as the gear part 730 rotates, gear teeth thereof engage with the threads 910 of the lead screw 900, so that a rotary motion and a rectilinear motion are simultaneously performed, thus allowing the lead screw 900 to move back and forth.

One end of the lead screw 900 is coupled with the main bracket 500, while the other end is coupled with the operating part 700, so that the lead screw 900 is moved back and forth as the operating part 700 is operated. Here, the one end of the lead screw 900 is coupled with the main bracket 500. However, a position where the lead screw 900 is coupled with the main bracket 500 may vary depending on design or environment.

According to this form, a hinge shaft 570 is formed on an upper portion of a front of the main bracket 500 to laterally traverse the main bracket 500. Although the hinge shaft 570 may be rotated, the hinge shaft 570 is fixed in this exemplary form. One end of the lead screw 900 is rotatably coupled to the hinge shaft 570. A through hole 930 is formed in one end of the lead screw 900, so that the through hole 930 is fitted over the hinge shaft 570, thus allowing the lead screw 900 to be rotated while being supported by the hinge shaft 570.

The main bracket 500 may include a front bracket 510 that is provided on a front side thereof and a rear bracket 530 that is provided on a rear side thereof. Links 511 and 531 are provided on upper portions of the front bracket 510 and the rear bracket 530 to traverse the brackets 510 and 530. The links 511 and 531 may be coupled to the brackets 510 and 530 to allow the brackets 510 and 530 to pivot back and forth around the links 511 and 531.

Therefore, one end of the lead screw 900 may be coupled to the hinge shaft 570. However, according to circumstances, the hinge shaft 570 may be omitted, and the lead screw may be rotatably coupled to the link 511 of the front bracket 510. Various changes may be made as desired depending on design or environment.

The electric-powered headrest according to one form of the present disclosure is operated as follows: in the state of FIGS. 1 to 3 where the headrest is not operated yet, a controller (not shown) applies an electric signal and then the driving part 710 of the operating part 700 is operated in response to the electric signal. Further, as the driving part 710 is operated, the lead screw 900 engages with the gear part 730 and moves forwards, thus drawing the main bracket 500 coupled with the hinge shaft 570 to the front direction. Since the main bracket 500 is coupled to the side brackets 400 and the base 300, respectively, via 4-point link coupling, the main bracket 500 protrudes forwards by the four link motion of the main bracket 500. FIGS. 4 to 6 illustrate states after the operation.

FIG. 7 is a view schematically illustrating an operation amount according to a moving distance of the lead screw 900 of the present disclosure. A conventional headrest that is adjusted back and forth in a straight line requires a lead screw having a length X corresponding to a front-rear operating length X. However, as illustrated in FIG. 7, the electric-powered headrest of the present disclosure is configured such that the lead screw 900 is obliquely assembled with the main bracket 500, so that the lead screw performs the link motion simultaneously while moving obliquely along the hinge shaft 570, and consequently, the operation amount (X+a) of the main bracket 500 is increased as compared to the moving distance X of the lead screw 900.

Particularly, by appropriately adjusting a position where the lead screw 900 and the main bracket 500 are assembled as desired, it is possible to obtain a desired operation amount even with a short lead screw 900, thus saving cost and reducing weight.

When comparing the electric-powered headrest of the present disclosure with the conventional headrest adjusted back and forth in the straight line, the present disclosure provides a larger operation amount per the same lead-screw length when using the same package, thus reducing the size of the headrest, achieving a reduction in weight, saving cost, and improving vehicle roominess.

Further, a user operates a driving part and a gear part using a switch, thus allowing a headrest to be delicately adjusted depending on his or her preference and convenience, and consequently increasing his or her convenience and comfort. Furthermore, the present disclosure reduces the risk of the headrest being arbitrarily moved forwards by an unintended external force at a headrest adjusting position and thereby coming into contact with a user's body, and reduces an increase in neck injury value due to the undesirable operation of a mechanism caused by external force, thus improving safety.

In addition, a driving part is operated using a separate switch, thus solving the problems of a manual headrest operating mechanism, for example, discomfort according to a passenger's body shape, and a difficulty in operation because it is difficult to recognize an operating direction, while improving operability and enhancing a user's recognizability and vehicle roominess and consequently increasing his or her convenience.

Further, it is possible to realize a maximum operation amount using a minimum package, thus minimizing the size of a headrest, reducing weight and cost, and attaining an unique model, thereby improving profitability and marketability. Consequently, it is possible to achieve a rebranding effect.

Although the forms of the present disclosure have been disclosed for illustrative purposes, those skilled in the art will appreciate that various modifications, additions and substitutions are possible, without departing from the scope and spirit of the present disclosure.

The invention claimed is:

1. An electric-powered headrest comprising:
   a plate-shaped base rigidly fixed to an upper portion of a stay rod and having a bent part formed therein, the bent part having opposite ends upwardly bent;
   a main bracket having a coupling part formed on a lower end thereof to be coupled to the bent part of the plate-shaped base, wherein a space is formed in the main bracket, and the main bracket is configured to pivot back and forth around the coupling part;
   an operating part arranged in the space; and
   a lead screw coupled at a first end thereof to the main bracket and coupled at a second end thereof to the operating part, so that the lead screw moves back and forth by an operation of the operating part.

2. The electric-powered headrest according to claim 1, wherein the lower end of the main bracket is coupled to the plate-shaped base via a pin to pivot back and forth.

3. The electric-powered headrest according to claim 1, further comprising:
   a bent plate-shaped side bracket provided on a side of the main bracket, the bent plate-shaped side bracket configured to support a headrest pad.

4. The electric-powered headrest according to claim 1, wherein a hinge shaft is formed on an upper portion of a front of the main bracket to laterally traverse the main bracket, the first end of the lead screw being rotatably coupled to the hinge shaft.

5. The electric-powered headrest according to claim 1, wherein the main bracket comprises a front bracket provided on a front side thereof and a rear bracket provided on a rear side thereof.

6. The electric-powered headrest according to claim 5, wherein at least one link is provided on upper portions of the front and rear brackets to traverse the front and rear brackets respectively, and the at least one link is coupled to the front and rear brackets, respectively, and configured to pivot the front and rear brackets back and forth around the at least one link.

7. The electric-powered headrest according to claim 1, wherein the operating part comprises a driving part configured to generate power, and a gear part coupled to a rotating shaft of the driving part and having a gear formed thereon, so that the gear of the gear part engages with threads of the lead screw to allow the lead screw to move back and forth.

* * * * *